United States Patent [19]
Luck

[11] 3,843,809
[45] Oct. 22, 1974

[54] MANUFACTURE OF ALCOHOLIC BEVERAGES

[76] Inventor: Egon Luck, 207 Baythorne Dr., Thornhill, Ontario, Canada

[22] Filed: Aug. 23, 1972

[21] Appl. No.: 282,953

[52] U.S. Cl. ............................................. 426/192
[51] Int. Cl. ............................................. C12g 3/06
[58] Field of Search ....... 99/30, 34, 35, 78, 171 CP; 426/192

[56] References Cited
UNITED STATES PATENTS

| | | | |
|---|---|---|---|
| 1,931,765 | 10/1933 | Leever | 99/78 X |
| 2,537,453 | 1/1951 | Frangialli | 99/78 |
| 2,791,324 | 5/1957 | Knoop et al. | 99/171 CP |
| 2,859,117 | 11/1958 | Braus et al. | 99/78 |
| 3,050,397 | 8/1962 | Carroll | 99/30 |

*Primary Examiner*—David M. Naff
*Attorney, Agent, or Firm*—Raymond F. Kramer

[57] ABSTRACT

Artificial wines, liquors, brandies and liqueurs may be made by treating vodka or other suitable alcoholic beverage with an organic acid such as citric, malic or tartaric acid, alkali metal sulfite catalyst-stabilizer and flavoring to make the desired beverage. To make wines, liquors, brandies, and liqueurs, water will also usually be employed, often together with a sweetening agent, such as invert sugar, and in the case of more viscous drinks, an organic gum or thickening agent may be utilized.

12 Claims, No Drawings

MANUFACTURE OF ALCOHOLIC BEVERAGES

The manufacture of alcoholic beverages, such as wines and brandies, is an ancient art. Wines are produced by the fermentation of grapes and other fruits or berries and brandies are produced by the distillations of wines. Sweetened, highly flavored alcoholic beverages known as liqueurs have also been very popular in recent years. Although many hosts may have stocks of different whiskeys, gins and vodka ready for guests, because of the great variety of wines, brandies and liqueurs it is only rarely that one entertaining guests can afford to have on hand representative varieties of the very great number of these different liquors. Thus, the present invention, which relates to the ready preparation of wines, brandies, liquors and liqueurs from other liquors, especially from vodka, by the use of flavorings, organic acids and a catalyst-stabilizer, allows one to prepare a wide variety of different wines, brandies, liquors and liqueurs from a basic liquor (and water) with the aid of the contents of the presently described kits. Another advantage of the invention resides in the ability of the host or "formulator" of the beverages being made to adjust flavor, tartness, sweetness and alcoholic content to suit the taste of the person being served. An additional advantage is in the novelty and do-it-yourself features of the method and its "ice-breaking" and conversation-generating aspects.

In accordance with the present invention, a method of making an alcoholic beverage comprises reacting an organic acid selected from the group consisting of citric, malic and tartaric acids, and mixtures thereof, with ethanol, in the presence of a proportion of a catalyst sufficient to catalyze the esterification reaction between the acid(s) and the ethanol, and adding a flavoring to the product. The invention also relates to the alcoholic beverages made and kits for practicing the above-described process in making such products.

To give the alcoholic beverages made by the present invention an "aging effect" and associated flavor, alcohol is reacted with an organic acid such as citric, malic or tartaric acid or any mixture of two or all of such acids, which mixture preferably includes at least 20 percent of the acid present in less or least quantity. The esterification of the ethanol by the organic acid produces desirable esters and other byproducts which contribute to a "mellowing" or aging effect produced on the wine or liquor made. Preferably, to keep the pH of the product at a most desirable level, there will also be present a buffering agent, which is normally a salt, such as an alkali metal salt, e.g., sodium or potassium salt, of any of the organic acids being employed, e.g., sodium citrate, potassium tartrate, sodium malate. The mentioned acids and salts occur in fruit and vegetable tissues and may be normal constituents of "natural" alcoholic beverages. They are available in solid form, usually as powders or other particulate materials, which facilitates their use in the present wine-making kits.

The alcoholic material that may be reacted with the organic acid or acids is anhydrous or aqueous ethanol, such as vodka or equivalent alcohol, which is usually of a 30 to 95 percent ethanol content, preferably of 40 to 55 percent ethanol. Of course, much of the ethanol acts only as a solvent and beverage and does not participate in the esterification reaction but essentially all of the acid reacts. Although mild tasting whiskeys, gins and sometimes, brandies, may be used as sources of ethanol, it is more preferable to employ neutral spirits, grain alcohol or vodka. Vodka is generally highly preferred because of its lack of taste, ready availability and guaranteed purity.

To facilitate the reaction of the organic acid and ethanol a very small quantity of esterification catalyst may be present. Of course, such catalyst should not interfere significantly with the taste of the alcoholic beverage being produced. When possible, it is preferred to employ those catalysts which also stabilize the esters made and aid in preserving the desired taste. However, if the alcoholic beverage is to be consumed soon after being made, as is often the case, the flavors will be at a peak at the time of drinking and do not require special stabilizing ingredients or a formulation in which there are no interfering components. Preferred catalysts for the esterification reaction are the bisulfites, such as the alkali metal bisulfites, e.g., sodium bisulfite and potassium bisulfite. Such compounds also exert stabilizing effects on the esters produced and help to prevent degradations of the esters, flavorings and other materials in the alcoholic beverages. Among other catalysts and stabilizers that may be used there may be mentioned reducing agents, such as sulfur dioxide, alkali metal metabisulfites, alkali metal phosphites, sodium benzoate and EDTA.

To give the wine, brandy, liquor, or liqueur characteristic and desired flavors, various other flavoring materials may be employed, in addition to the in situ generated esters. Thus, fruit extracts, such as grape, blackberry, cherry, elderberry, apple and peach flavorings may be utilized, alone or in mixture. Other and similar flavorings may be either synthetic or naturally produced. Mint flavors, such as spearmint and peppermint, chocolate, vanillin and other natural and synthetic flavors may be employed, alone or in mixture, especially to make the various liqueurs. Natural flavorings may be derived from originally naturally produced wines, brandies and liqueurs or directly from the fruits, and may be employed mixed with vodka or another source of alcohol to make the present alcoholic beverages. Normally, such flavor extracts obtained from wines or other alcoholic beverage will be essentially the same as those in the original wine, brandy, liquor, or liqueur, except for the removal of alcohol and water therefrom.

While sugar need not be added to all the present alcoholic beverages, it may be desirable to add it in small quantities to some of the wines and in larger quantities to the liqueurs, with intermediate amounts being present in the brandies. The sugar used may be sucrose, glucose, levulose, fructose, maltose or any other suitable hexose or pentose but preferably will be invert sugar, an approximately 50:50 mixture of dextrose and levulose. Various sugars may be employed in dextro-, levo-, or racemic forms. Similarly, of the organic acids previously mentioned to be utilized the dextro-, levo-, meso-, and racemic forms are operative. In addition to the natural sugars, one may employ artificial sweetening agents as partial or complete replacements for the sugars. Thus, when permitted, sodium saccharin, sodium and calcium cyclamates, glycine and aspartyl phenylalanine, ethyl and methyl esters, may be employed, usually in very small quantities, e.g., 0.0001 to 0.1 percent. For best flavorings, mixtures of such artificial sweeteners may be used and in some cases it is preferred to have from 2 to 100 times as much sugar present with the artifical sweetener(s). The presence of large quantities of sugar in alcoholic beverages tends to thicken the beverage, whereas the higher the alcoholic content, normally the thinner the beverage will become. In some cases, as with liqueurs, it may be desirable to have the final product of a viscosity appreciably greater than that of water, e.g., from 2 to 100 centipoises at 25°C. Especially when artificial sweeteners are employed in the liqueurs and in those cases wherein it is not desirable for the alcoholic beverage to be too sweet, an organic gum or colloidal material may be employed to thicken the beverage. Among the suitable thickeners are carob bean gum, sodium alginate, carrageenin, starches, locust bean gum, agar agar, and pectins. Of these, it is preferred to employ carrageenin for taste and thickening considerations. For best thickening with carrageenin calcium and/or potassium ions will also be present. If artificial gums are used, the most preferable are the alkyl celluloses, e.g., hydroxyethyl cellulose, and sodium carboxymethyl cellulose.

The water used may be ordinary tap water but it is preferred that it have a hardness content of less than 100 parts per million, more preferably less than 50 p.p.m., on a calcium carbonate basis. More preferably, deionized water or distilled water is used, fortified with calcium and/or potassium ions at 10 to 15 parts per million. Yet, as was mentioned previously, with the present kits and following the described methods, if the alcoholic beverage is to be consumed soon after manufacture, stability problems are not as significant as those normally encountered in winemaking.

The proportions of the various constituents of the present alcoholic beverages, on a final product wine, brandy, liquor, and liqueur basis, will depend on the particular type of beverage being made. Thus, wines will normally be of 6 to 22 percent alcohol content, generally of 7 to 15 percent, while brandies, liqueurs and other liquors will normally contain from 20 to 60 percent of ethanol, usually from 30 to 45 or 50 percent thereof. The citric, malic and/or tartaric acid content of the beverage will normally be from 0.1 to 3 percent and will preferably be from 0.5 to 1.5 percent. The proportion of sodium or other alkali metal salt of citric, malic or tartaric acid will normally be from 0.01 to 0.5 percent of the beverage. Generally, the ratio of the organic acid to ethanol will be from 0.005 to 0.05 and that of the salt to the acid will be from 0.05 to 0.25. The pH of the product will be regulated by the proportions of acid and buffer salt contents, as well as by the amounts present of other materials, during and after manufacture, to be in the range of 3 to 7 preferably 4 to 6.

As a catalyst for the esterification reaction and a stabilizer for the organic esters made and other organic ingredients present, including thickening agent, when used, there will be present from 0.1 to 200 parts per million of sodium bisulfite or other suitable bisulfite or preservative material, preferably from 1 to 20 p.p.m. thereof. The sugar content will be from 1 to 35 percent and the flavoring will be from 0.1 to 5 percent of the final beverage. In the case of creme type preparations or liqueurs there may also be present from 0.2 to 3 percent of an organic gum, preferably carrageenin or gelatin, and such gum is stabilized against degradation and loss of thickening power by the presence of the alkali metal bisulfite or other preservative. The water content of the present beverages, which enters into the formula with the vodka or aqueous ethanol and may also be added during the manufacture of the alcoholic beverage and/or the present beverage mixes, will usually constitute the balance of the composition. The proportion of water may be from about 20 to 92 percent but will usually be 40 to 85 percent.

In a preferred form of the invention, the various constituents named, except for ethanol, water and sometimes also sugar, are packed in a kit, which comprises separate compartments in a single container or several containers or may also be a plurality of individual packages, combined into a unit. The proportions of materials present, generally in liquid (aqueous solution) form, will be within the ranges described above, on a solids basis, so as to facilitate the making of any of a variety of alcoholic beverages from the same constituents. Although liquid mixers are preferred for easiest blending, powdered products, such as those which may be made by blending powdered ingredients or by dehydrating liquid preparations, as by freeze drying, are also useful. If desired, additional flavoring constituents may also be employed, generally in quantities each less than 1 percent of the total alcoholic beverage, which constituents include oenanthic ether, tannic acid, phosphoric acid, glycerol, ethyl nonylate and esters of capric and caprylic acids.

The manufacture of wines, brandies, liquors and liqueurs in accordance with this invention is a simple matter. The amounts of organic acid, catalyst or catalyst-stabilizer, buffer salt and flavoring materials are weighed out or measured from those supplied with the kit or pre-weighed packages, mixes or solutions thereof are used. If a kit is not used the various mentioned ingredients may be weighed out from individual supplies. With the kit, however, general instructions are supplied as to the proportions to be utilized to obtain alcoholic beverages of the various mentioned types and the "mixologist" may then make modifications of these proportions, as desired, to obtain particular tastes or effects. The desired weights or volumes of vodka or other source of ethanol, sugar and water are also measured out, ready for use. The aqueous ethanol, of 30 to 95 percent ethanol content, the organic acid or acid mixture, buffer and catalyst, e.g., sodium bisulfite, are mixed (if not already pre-mixed) and the temperature of the reaction mix is elevated. Alternatively, the temperature of the ethanol may be elevated initially and the bisulfite and organic acid may be added to it. After about 5 to 20 minutes reaction it is considered that esterification is complete and the temperature, which is then from 40° to 60°C., is lowered to 5° to 25°C., if no other ingredients are to be added which are difficulty soluble at the lower temperatures. If sugar, flavoring, buffer salt and any other materials are to be added and do not dissolve quickly at ambient temperatures, addition thereof should be made at the elevated temperature, e.g., 40° to 60°C. The order of admixing is not critical, although it is preferred to dissolve the buffer salt in the alcohol-water-ester solution before addition of the flavorings. Also, when possible, to maintain the integrity of the flavorings it will be preferable to add them at a lower temperature, providing that they are readily soluble at such temperature. During the reaction of the organic acid and the ethanol, it is preferred to carry out the addition in such a manner that the pH is maintained in the 3 to 7 range, preferably 4 to 6, during the entire reaction. In some cases, the buffer salt will be added before or during the esterification. Of course the organic gum, when present, is preferably added to the alcohol prior to flavor addition and esterification and may be added when the reaction mixture is held at an elevated temperature, which facilitates dissolving of the gum in the finished material.

In a variation of this procedure, all the ingredients are mixed together initially, heated to the reaction temperature range and then cooled, for best clarity of the product. Filtration through filter paper, glass wool or a filter bed of cellulosic or calcareous material may be employed.

In addition to making sparkling clear alcoholic beverages of high purity, the present method also allows for the production of desirably colored liquids. Often the natural coloration of the flavoring material will be sufficient to give the beverages the desired appearance but in some circumstances additional coloring agents, such as F.D.&C. Red, Yellow, Green and Blue dyes may be employed to produce the best looking colors in the final products. Normally, any such dyes or other colorants will be compounded with the flavoring agents but separate dyes may be employed. To make sparkling wines is also a simple matter. In such cases, after cooling of the beverage, any diluting water is added from a siphon bottle or other source of sparkling water. Alternatively, carbon dioxide may be bubbled through the beverage, preferably while maintaining it under a pressure of 10 to 50 pounds per square inch.

The following examples illustrate the invention. All parts given are by weight and all temperatures are in °C., unless otherwise mentioned.

EXAMPLE 1

| | Percent |
|---|---|
| Citric acid | 45.5 |
| Sodium citrate | 20.2 |
| Vanilla | 2.0 |
| Dextrose | 20.5 |
| Sodium carboxymethyl cellulose, 65% active | 0.02 |
| Tartaric acid | 10.05 |
| Sodium metabisulfite | 0.05 |
| Gum acacia | 1.04 |
| Gelatin | 0.04 |
| Alpha ionine | 0.6 |

The above is the formula of a base mix of materials from which specific kits or preparations are made for the manufacture of particular alcoholic beverages by mixing with vodka or vodka-water mixtures. The base mix is manufactured by blending together the powdered ingredients in suitable mixing equipment. If it is desired to add any liquid ingredients, they may be converted to powdered form by depositing them on the surfaces of larger volumes of powdered ingredients and then mixing well to disperse them so that the product is a free flowing powder.

The described base is then utilized in the manufacture of particular beverage essences in the manner described in the following examples. To obtain a variety of products the base compositions are adjusted within the following component ranges:

| | Percent |
|---|---|
| Citric acid | 35 – 55 |
| Sodium citrate | 10 – 30 |
| Vanilla | 1 – 3 |
| Dextrose | 10 – 30 |
| Sodium carboxymethyl cellulose | 0.01 – 0.2 |
| Tartaric acid | 5 – 15 |
| Gum acacia | 0.5 – 2.0 |
| Gelatin | 0.02 – 0.2 |
| Alpha ionine | 0.3 – 1.0 |

EXAMPLE 2

| | Percent |
|---|---|
| Base mix | 0.4 |
| Drambuie Flavor S-13381 (Ritter) | 0.07 |
| Vanilla (Pat) | 1.4 |
| Imitation Burgundy Wine Flavor No. 570 | 1.4 |
| Caramel | 0.55 |
| Sodium benzoate | 0.1 |
| Water | 96.08 |

At a temperature of 70°C. there are added to the water the base, vanilla, flavors, caramel and sodium benzoate and agitation is continued until the components are completely dissolved, which normally takes less than five minutes. The hot mix is then filled in bottles, cooled and is ready for use in making a Scotch-Honey liqueur.

EXAMPLE 3

| | Percent |
|---|---|
| Base mix | 1.5 |
| Extract S-13305 (Ritter) | 2.0 |
| Sodium benzoate | 0.1 |
| Water | 96.4 |

At a temperature of about 60°C. the base mix, extract and sodium benzoate are added to the water and the mix is agitated until the components are dissolved, after which it is filled into suitable bottles, which are sealed, aged for at least a day, and are then ready for use. To aid in preserving the flavoring essence better, in a variation of this procedure the base mix and sodium benzoate are dissolved in the hot water and the product is cooled to 30°C., at which temperature the extract is added, after which the product is cooled further to room temperature and is bottled. The essence made is used to produce an imitation Kummel liqueur.

EXAMPLE 4

| | Percent |
|---|---|
| Cherry Heering base mix | 5.4 |
| Flavor S-13381 (Ritter) | 20.0 |
| Cherry Flavor 11685 (Fries and Fries) | 3.5 |
| Burgundy Wine Flavor No. 570 | 1.4 |
| Malt extract | 2.6 |
| Sodium benzoate | 0.1 |
| Red F. D. & C. food coloring (1% aqueous solution) | 11.7 |
| Blue F. D. & C. food coloring (1% aqueous solution) | 0.65 |
| Water | 54.65 |

An imitation Cherry Heering liquor is produced from the above essence by blending it with vodka in a manner to be described later.

EXAMPLE 5

|  | Percent |
|---|---|
| Base mix | 6.5 |
| Orange Curacao Flavoring S-13305 (Ritter) | 30.7 |
| Sodium benzoate | 0.1 |
| Yellow F. D. & C. color, (1% aqueous solution) | 3.9 |
| Red F. D. & C. color, (1% aqueous solution) | 1.3 |
| Water | 57.5 |

The above essence, useful for making Orange Curacao beverage, is produced by the methods utilized in Examples 1–3.

EXAMPLE 6

|  | Percent |
|---|---|
| Base mix | 8.2 |
| Creme de Cacao Flavoring S-13381 (Ritter) | 10.0 |
| Flavor No. 22059 (Fries and Fries) | 2.5 |
| Caramel color | 2.3 |
| Sodium benzoate | 0.1 |
| Water | 76.9 |

EXAMPLE 7

A sherry wine essence is made by blending together the base mix (1.5 percent), imitation sherry wine mix, Fries and Fries (1.4 percent), sodium benzoate 0.1 percent and water (97 percent). Variations of wine essences may be made by changing the wine flavoring to Bordeaux, Burgundy, Port, etc. and fruit wines may be made by using fruit flavoring in addition (usually from 1 to 5 percent). If desired, additional sugar, (from 1 to 20 percent) may be added in place of some of the water. Methods for manufacturing this essence are essentially like those of the previous examples given (2–7) and additional sugar may be added when the imitation wine is made. In some cases, it may be desired to manufacture a beer essence and in such instances sapium may be employed, together with carbonated water to give the beer a good head. Malt essences and beer flavors will be used in place of the wine or liqueur flavorings in about the same proportions.

In variations of the above examples, the liquid products made are vacuum dehydrated or freeze dried or, in some instances they are produced by blending dried materials, water having been removed and any liquid component having previously been dehydrated.

The finished alcoholic beverage is made by mixing vodka and liqueur essence so as to produce a volume of beverage about 15 to 40 times that of the essence, preferably about 20 to 30 times and most preferably about 26 times, as in these examples. Mixing is usually effected at room temperature and the proof of the product is adjusted by using water and vodka mixtures or by adding such materials sequentially. If desired, instead of vodka, other sources of ethanol may be employed, including alcohol produced by the consumer from fermentation of sugar or other such material. However, best products are obtained when 80 to 100 proof vodka is employed. The proportion of vodka and water utilized is such as to produce wines, liqueurs, brandies and liquors of the prescribed proof for such beverages, e.g., 35 proof for wines, 86 proof for liquors, 50 proof for liqueurs and 80 proof for brandies.

If desired, additional sugar, preferably invert sugar, may be added to the beverages or the organic acids mentioned may be added to increase the tartness. The pH of the essences will normally be in the range of 3 to 7 and that of the final beverage will be from 4 to 7.

While the invention may be practiced by using the individual materials described, it is preferred to employ them in kit form and, as shown in the working examples, to manufacture essences from which the final beverages may be made without difficulty.

The invention has been described with respect to specific exemplifications thereof but is not to be limited to these because it is evident that one of ordinary skill in the art will be able to employ substitutes and equivalents without departing from the invention.

What is claimed is:

1. A method for making an alcoholic beverage which comprises reacting an organic acid selected from the group consisting of citric, malic and tartaric acids, and mixtures thereof, with ethanol to obtain esterification between the acid and ethanol, with the proportion of organic acid being from about 0.1 to 3 percent on a final beverage basis and with the amount of ethanol being sufficient to provide a beverage containing about 6 to 60 percent of ethanol, in the presence of about 0.1 to 200 parts per million of a bisulfite esterification catalyst for the reaction, said proportion of such catalyst being sufficient to catalyze the esterification reaction between the acid and ethanol, and admixing a flavoring proportion of a flavoring agent with the mixture of alcohol and ester produced.

2. A method according to claim 1 wherein the ethanol reacted with the organic acid is an aqueous ethanol of 30 to 95 percent ethanol content, the catalyst is selected from the group consisting of alkali metal bisulfites and metabisulfites, the reaction between the acid and the ethanol is effected at elevated temperature, the flavoring is dissolved in the product and the product is cooled to a temperature of 5° to 25°C.

3. A method according to claim 2, wherein there is present with the organic acid a buffering quantity, from 5 to 50 percent of the acid content, of a salt of such an acid, the pH is maintained in the range of 3 to 7 during the reaction, the reaction is effected at a temperature of 40° to 60°C., from 1 to 35 percent of sugar is admixed with the reaction product at the elevated temperature and a diluting quantity of water, from 10 to 60 percent of the reaction mixture, is admixed with the product.

4. A method according to claim 3 wherein the organic acid employed is citric and the buffering agent is an alkali metal citrate, the sugar is invert sugar, the starting alcohol is vodka and the alcohol content of the product is from 6 to 22 percent.

5. A method of making an alcoholic beverage which comprises mixing with an aqueous alcohol selected from the group consisting of vodka and vodka plus water, an organic acid selected from the group consisting of citric, malic and tartaric acids and mixtures thereof in an amount between about .1 and 3 percent of the beverage, in the presence of an effective proportion, between about 0.1 and 200 parts per million, of a bisulfite esterification catalyst to promote production of the ethyl ester of such acid, and a flavoring quantity of flavoring agent, to produce a beverage containing between 6 and 60 percent ethanol which is an imitation wine, brandy, liquor or liqueur.

6. An alcoholic beverage which comprises an ethyl alcohol ester of an organic acid selected from the group consisting of citric, malic and tartaric acids and mixtures thereof, aqueous ethanol of 6 to 60 percent ethanol content, the proportion of ethyl alcohol ester corresponding to the proportion of organic acid reacted with ethanol to form the ester, which is in the range of about 0.1 to 3 percent of the beverage, from 0.1 to 200 p.p.m. of bisulfite esterification catalyst sufficient to stabilize the ethyl ester of the acid in the alcoholic beverage, and a flavoring amount of a flavoring agent.

7. An alcoholic beverage according to claim 6 wherein the aqueous ethanol is vodka, the flavoring is a natural flavoring and constitutes from 0.1 to 5 percent of the beverage and there is sugar present in the beverage to the extent of 1 to 35 percent thereof.

8. An alcoholic beverage according to claim 7 wherein the organic acid is citric acid, there is present an alkali metal salt of citric acid in a proportion which is from 5 to 50 percent of the citric acid reacted to form the ethyl citrate, the catalyst is selected from the group consisting of alkali metal bisulfites and metabisulfites, the pH of the beverage is in the range of 4 to 6 and the alcoholic content of the beverage is from 6 to 22 percent.

9. An alcoholic beverage according to claim 8, thickened with from 0.2 to 3 percent of an organic gum which is stabilized against degradation and loss of thickening power by the presence of sodium bisulfite.

10. An alcoholic beverage according to claim 9 wherein the thickening gum is carrageenin or gelatin.

11. A kit, useful with alcohol for making alcoholic beverages, which comprises separate or compartmented container(s) containing a solid organic acid selected from the group consisting of citric, malic and tartaric acids, and mixtures thereof, alkali metal salts(s) of such acid(s), bfisulfite catalysts for the esterification of ethanol with said acids and flavorings adapted to produce liqueur, liquor, brandy and wine-type alcoholic beverages, with the proportions of contents of such separate or compartmented containers(s) being such as to provide when mixed the beverage of claim 6.

12. A kit according to claim 11 wherein the separate containers or compartments contain citric acid, sodium citrate, sodium bisulfite, liqueur, brandy, liquor and wine flavors and invert sugar, so that by reacting and mixing the kit contents with vodka and water, liqueur, brandy, liquor and wine-type alcoholic beverages may be selectively made from the kit components.

* * * * *